(12) United States Patent
Delatorre

(10) Patent No.: US 6,459,383 B1
(45) Date of Patent: Oct. 1, 2002

(54) DOWNHOLE INDUCTIVELY COUPLED DIGITAL ELECTRONIC SYSTEM

(75) Inventor: Leroy C. Delatorre, Sugar Land, TX (US)

(73) Assignee: Panex Corporation, Sugar Land, TX (US)

(*) Notice: Subject to any disclaimer, the term of this patent is extended or adjusted under 35 U.S.C. 154(b) by 0 days.

(21) Appl. No.: 09/416,768

(22) Filed: Oct. 12, 1999

(51) Int. Cl.⁷ .................................................. G01V 3/00
(52) U.S. Cl. .............................. 340/854.9; 340/854.8; 340/855.1; 166/250.11
(58) Field of Search ............................ 340/854.8, 854.9, 340/854.6, 855.1, 853.3, 855.9; 166/250.11

(56) References Cited

U.S. PATENT DOCUMENTS 5,455,573 A * 10/1995 Delatorre ................. 340/854.8
5,457,988 A * 10/1995 Delatorre ................. 340/854.6
5,597,042 A * 1/1997 Tubel et al. ........... 166/250.15

* cited by examiner

Primary Examiner—Timothy Edwards

(57) ABSTRACT

A communication system between remote locations connected by a common wire conductor where AC power (40) is supplied from one location to one or more remote locations (32 and 34). At the remote locations, inductor coil components (28,32) and (30,34) provide power to an instrument (24,26). The AC power is modulated with surface selected discrete frequencies (56) to operate a specific selected remote location. At the selected remote location (24), the AC power is rectified and a logic processor detects the discrete frequencies for that location and operates the instrument. Data from the instrument is translated by current modulation (60) which is demodulated at the one location (50,64,66,68,70).

7 Claims, 2 Drawing Sheets

DOWNHOLE INDUCTIVELY COUPLED DIGITAL ELECTRONIC SYSTEM

FIELD OF THE INVENTION

This invention relates to data and power communication between a surface location or station and a well tool in a well bore, and more particularly, to a system for transmitting power from a surface location to a downhole well tool or tools and for selectively communicating data signals between the surface location and a well tool for selective retrieval of data from a well tool.

BACKGROUND

As oil field technology advances, there is a need to have one or more parameter measurement tools on a more or less permanent or semi-permanent basis located in a well bore. The tools typically are desired to measure parameters such as pressure, temperature, fluid flow and density. Because such tools utilize electronics and have other components which may require attention from time to time, the tools can be made to be retrievably set in side pockets located along the well string. Alternatively, tools can be installed on a non-retrievable basis. Thus, the tools can be retrieved as deemed necessary from time to time.

A side pocket or side pockets or retrievable tools are respectively coupled by a single wire conductor cable to equipment at the surface location. In each side pocket is an inductor coupler component (usually a probe member) which receives an inductive coupler component located in a socket of the well tool. At present, the well tool obtains its electrical power from internal DC batteries. Data communication is effected via the conductor cable.

It is desirable to eliminate the requirement for non-retrievable electronics in the well tool and to communicate data from a well tool by supplying the power and communication data on a common conductor cable. Since the inductive coupling components basically define a transformer, the power and data communication functions must be accomplished with AC voltages and currents which are impressed upon a conductor cable line. The difficulty with this approach is that the power frequently should be as low as possible so that reactive currents in the conductor cable line are minimized. At the same time, data communication frequencies would like to be as high as possible to prevent undue restriction of data communication rates. These requirements present a conflict because choosing a power frequency too close to the communication frequencies will result in separation difficulty for low level current modulation communication frequencies in the presence of the high level power frequency. Secondly, separation of the address voltage frequencies (for different tools) from the power frequency becomes a significant problem downhole because of limited space and power available to implement sophisticated frequency filters.

The modulation and detection schemes used to implement the present invention addresses both of these issues and result in simple, highly reliable, simultaneous communications and power with the operating frequencies relatively close to one another.

SUMMARY OF THE PRESENT INVENTION

In the present invention, at a surface location, a power source with a selected frequency is utilized to supply AC power via a conductor cable to one or more downhole inductor coupling component(s). A downhole well tool(s) with a cooperating inductor coupling component has a full wave rectifier which supplies operating DC power for the well tool. A well tool configured for use with the present invention includes a parameter sensing means for sensing pressure, temperature, fluid flow or density which senses the parameter and develops a digital signal as a function of the sensed parameter. The digital signal measurements are stored in an addressable gate array unit and are output when addressed in a current modulation transmission mode.

Also in the well tool is a level detector which senses the rectified output of the rectifier and detects an amplitude modulation of the rectified output signal for providing a digital address to the well tool gate array logic unit.

Hence, the downhole tool obtains DC power from a rectifier and detects an address signal modulated on the power frequency.

At a surface location, a discrete digital address for a given well tool is provided by a Frequency Shift Keying (FSK) communication signal which is impressed upon the power frequency. FSK frequencies of 600 and 1200 Hz are adequately high for data purposes and, of course, separate the 0 and 1 bits of a digital signal.

The amplitude modulation of the FSK communication signals on the power frequency is automatically demodulated by the power rectification in the well tool so that all that is required is to separate the modulation frequency from the power frequency ripple. This is accomplished by a filter capacitor selected so that the ripple frequency amplitude of the rectified signal is significantly smaller than th modulation frequency amplitude. A level detector then rejects the smaller amplitude ripple frequency and follows the larger amplitude modulation.

At the surface location the power frequency is selected as an exact multiple of the modulation frequencies (4.8 Khz) which minimizes the possibility of introducing a DC signal component into the line frequency.

Data transmission is effected by a well tool current modulation means which modulates the power current as a function of the data being transmitted by the well tool in response to the address signal. At the surface location, a current demodulation transforms the current signals into digital signals representative of the well tool signals.

DESCRIPTION OF THE INVENTION

Figure 1:
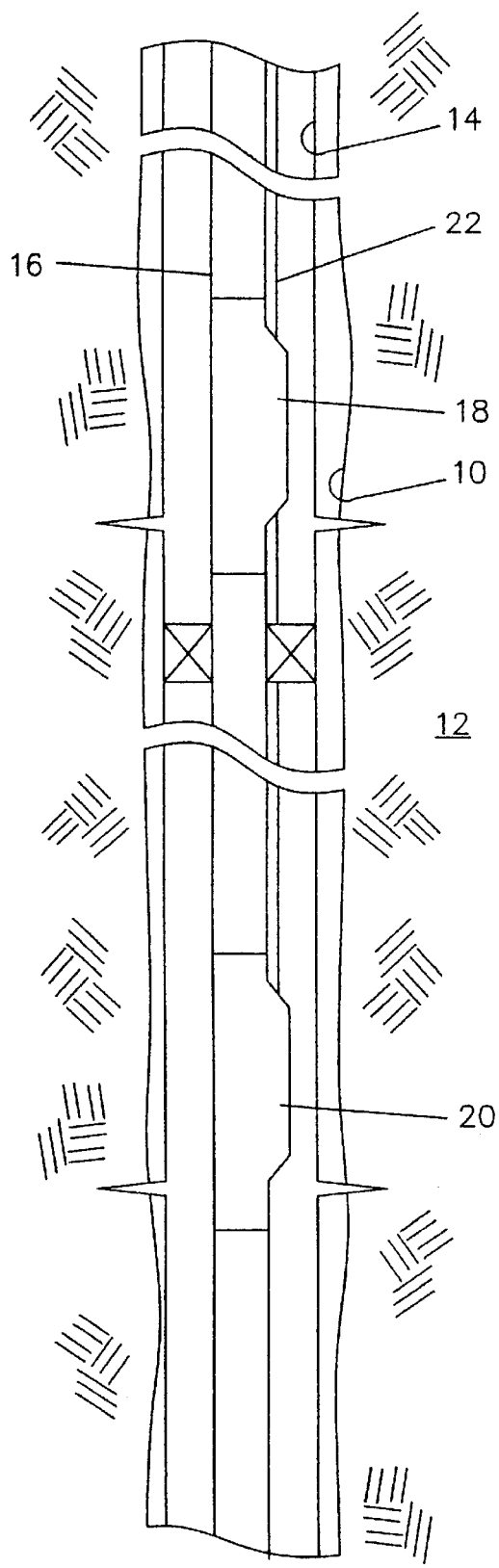
FIG. 1 is a schematic representation of a well bore application of the present invention.
Figure 2:
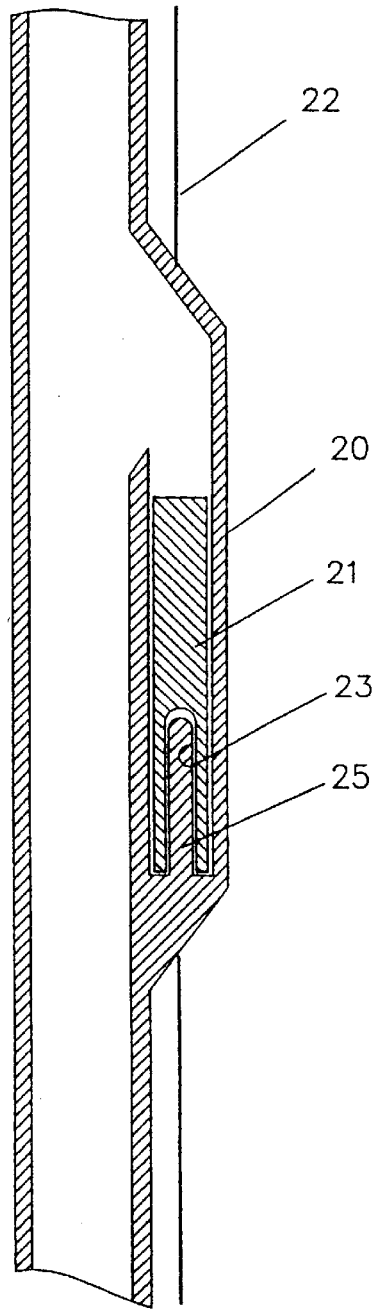
FIG. 2 is a schematic representation of side pocket with a well tool.

Referring now to FIG. 1, a schematic representation of a well bore 10 traversing earth formations 12 is illustrated. The well bore 10 includes a cemented liner or casing 14 and a production tubing string 16. The production tubing string 16 may have a number of spaced apart side pocket mandrels, two such pockets 18,20 being illustrated. A side pocket mandrel is constructed and arranged to retrievably receive a well tool 21 for measuring downhole parameters such as pressure, temperature, density and fluid flow (See FIG. 2). A well tool 21 contemplated by the present invention utilizes an inductive coupler which includes an interfitting pocket 23 on a well tool and a probe 25 in a side pocket mandrel. Inductor coils provide for supplying power and coupling digital data signals from a well tool to a conductor wire 22 which extends to a surface location. Heretofore, electronics have been incorporated within the pin inductive coupler to allow DC power voltage to be used on the cable, these were not retrievable. In the present invention, the power supply can be located at the surface location and both power and data communications can be implemented on a common communication carrier.

An objective of the present invention is to provide the capability to supply power and simultaneously communicate digitally with one or more downhole gauges or well tools which are connected by means of inductive couplers to the same cable. Since inductive couplers are essentially transformers, all functions must be accomplished by means of AC voltages and currents impressed on the communication carrier line.

Figure 3:
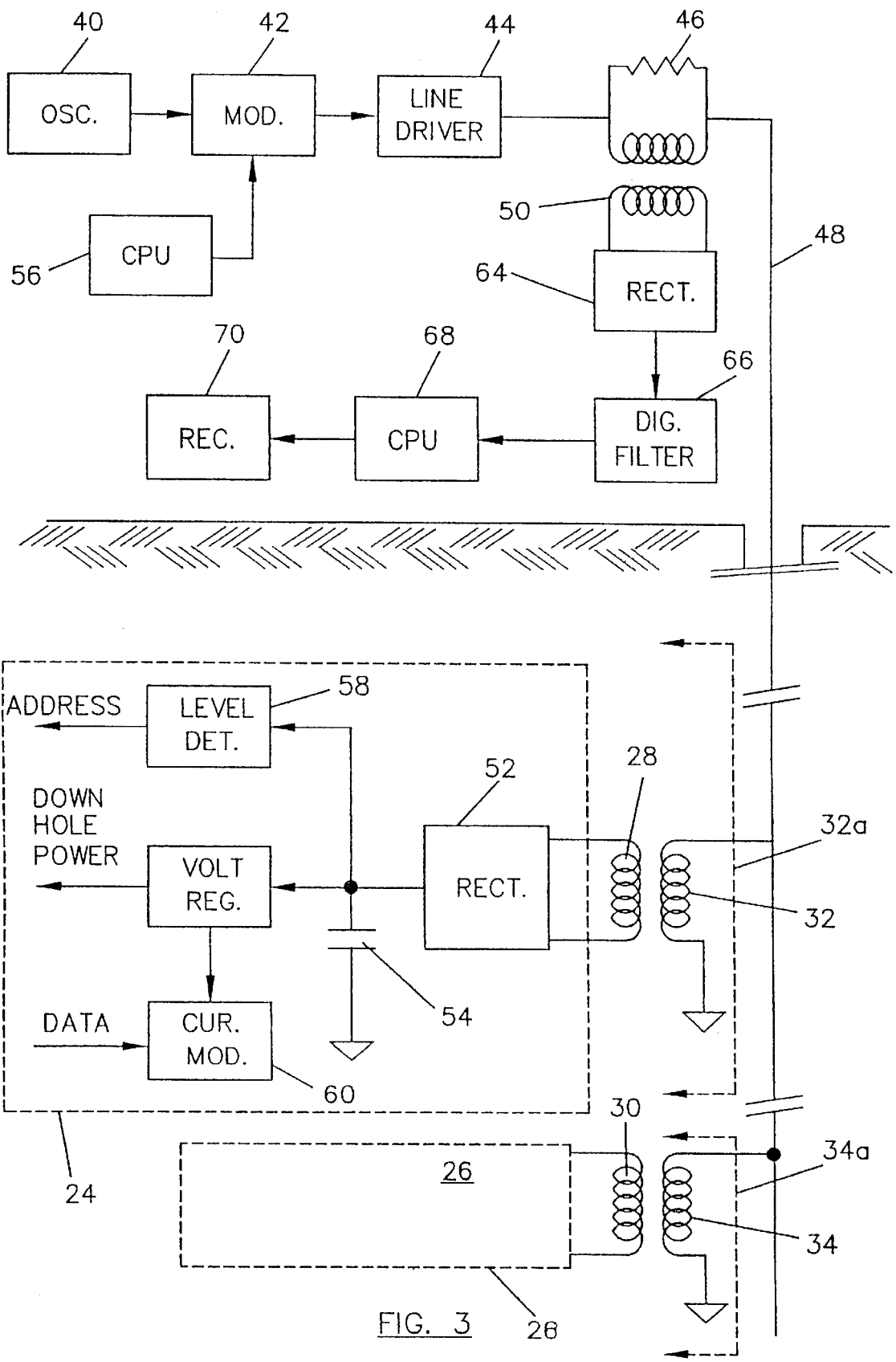
FIG. 3 is a schematic illustration of the present invention.

In the application of the present invention, (See FIG. 3), each well tool 24,26 (shown in dashed line) is coupled by an inductive coupler component 28,30 to an inductive coupler component 32,34 in a side pocket mandrel 32a, 34a (shown in dashed line). At a surface location, an AC power voltage is supplied by an oscillator 40 via a modulator 42 and line driver 44 to apply AC power to all of the inductive couplers on a communication carrier or cable 48. Each well tool 24,26 is configured electronically to wait in a standby or sleep state until addressed by a frequency shift keying (FSK) signal from the surface location. Also at the surface location and in the communication line 48 is a signal detector 46 which has an inductive coil coupling 50 to the communication line or cable 48.

With a long cable it is desirable to choose the power frequency to be as low as possible so that reactive currents can be minimized. At the same time, choice of the communication frequencies should be as high as possible to prevent undue restriction of data rates. Ordinarily these requirements are in conflict because choosing a power frequency too close to the communication frequencies will result in separation difficulty for the low level current modulation communication frequencies in the presence of the high level power frequency. Secondly, separation of the address voltage frequencies from the power frequency becomes a significant problem downhole because of limited space and power available to implement sophisticated frequency filters.

In the present invention, the modulation and detection systems overcome these problems. Communication frequencies in the range of 600 and 1200 Hz are adequate for most data transmission purposes. By using a power frequency which is two octaves higher at 4.8 Hz, both the power and communication frequencies are able to operate without interference.

As discussed above, a well tool system is dormant until addressed by a discrete FSK communication signal. The address signal, which is unique for each well tool, is sent downhole by means of voltage modulation of the power frequency (as opposed to impressing it on the communication carrier in addition to the power frequency). The advantage of this choice is that the power frequency is used as a carrier and demodulation automatically takes place in the well tool through the rectification necessary to generate DC power. A full wave rectifier 52 is shown in the well tool 24. All that is required to separate the modulation frequencies from the power frequency is the judicious selection of the filter capacitor 54 so that the ripple frequency amplitude is significantly smaller than the modulation frequency.

A discrete address modulation frequency is input at the surface location by a CPU unit 56 which is programmed to superimpose an FSK communication signal on the voltage frequency. In the well tool, a level detector 58 is designed to reject the smaller amplitude ripple in the rectified signal and to follow the larger amplitude modulation. Also it should be noted that the full wave rectification also results in a ripple frequency that is double the power frequency. This means that the communication frequencies are now separated from the power ripple frequency by three octaves instead of two, resulting in easier separation.

It is essential that no significant DC component be introduced into the power signal driving the line since this could cause over and under shoot on the wave form. This effect could occur by switching amplitudes of the power frequency (due to modulation) in the middle of a cycle and then switching back at a different point of the cycle (even though multiple cycles may have passed). This is avoided by choosing the power frequency to be an exact multiple of the modulation frequencies (4.8 KHz is an exact multiple of 1.2 KHz and 0.6 KHz). Further refinement could also be added by synchronization of the power frequency to the communication frequencies, but this is not necessary.

In the well tool 24, once the tool is addressed and awake, it provides an output of data. The data output is obtained in an established manner by using a current modulation means 60 to modulate the power current drawn in the communication carrier cable as a function of the data signal. At the surface location, the coupler 50 senses the power current and a signal representative of the current drawn by the line is full wave rectified by a rectifier 64 at the surface location. The modulation is then separated from the ripple frequency by a multi-stage active digital filter 66 because its level is too low to use the discrimination technique employed downhole. Again, this task is easier because of the frequency doubling effect on the ripple frequency. The signal is processed in a CPU 68 and supplied to a recorder means 70.

In summary, the communication frequencies are always used to modulate the power frequency. In the case of communication downhole from the surface, this is done by amplitude modulating the power frequency voltage level. A similar thing happens when data is sent uphole from the well tool, since the well tool does this by modulating the current it draws. This automatically amplitude modulates the power frequency current supplied from the surface so that this signal can be demodulated in the same manner as the voltage signal from the surface. The carrier (power frequency) is effectively removed by rectification and the communication signal is recovered.

What is claimed is:

1. A system for providing data and power communication between a first surface location and at least one instrument located at a remote location over a common wire conductor including:

at said first surface location, means for generating AC power at a given power frequency means for impressing a discrete digital address on the power frequency by modulation frequencies;

means for demodulating the current of the AC power for deriving digital signals representative of function of the operation of the instrument generated at said remote location;

at said remote location, receptacle means having a first inductive coupler component, instrument means receivable in said receptacle means and having a second inductive coupler component which cooperates with said first inductive coupler component for transferring AC power, means in said instrument for rectifying said AC power to provide a rectified signal output which provides operating DC power which has amplitude modulation as a function of the discrete digital address, means for detecting amplitude modulation of the rectified signal output and providing a digital address, logic processor means in said instrument responsive to said digital address for controlling the operation of said instrument, current modulation means in said instrument for modulating the power current as a function of the operation of the instrument, and said power frequency being an exact multiple of said modulation frequencies.

2. The system as set forth in claim 1 and further including more than one remote location where all the locations are connected to the common wire conductor each remote location has receptacle means having a first inductive coupler component, instrument means received in said receptacle means and has a second inductive coupler component which cooperates with said first inductive coupler component for transferring AC power, and has means in said instrument for rectifying said AC power to provide a rectified signal output which provides operating DC power which has amplitude modulation as a function of the discrete digital address, and further has means for detecting amplitude modulation of the rectified signal output and providing a digital address, and still further has logic processor means in said instrument responsive to said digital address for controlling the operation of said instrument, and also has current modulation means in said instrument for modulating the power current as a function of the operation of the instrument, and said power frequency being an exact multiple of said modulation frequency, and the logic processor means at each of said other locations being responsive to a different discrete digital address whereby said locations may be selectively operated.

3. The system as set forth in claim 1 or 2 wherein a remote location within a well bore traversing earth formations and said receptacle means includes a side pocket mandrel and said instrument means includes a pressure gauge.

4. The system as set forth in claim 1 wherein the discrete digital address is a FSK communication signal.

5. The system as set forth in claim 4 wherein the power frequency is 4.8 Hz and the modulation frequencies are 1.2 KHz and 0.6 Hz.

6. A method for communication AC power and data signals over a common wire conductor between a surface location and at least one instrument located at a remote location where the instrument at the remote location is retrievably located in a receptacle and the receptacle and the instrument have cooperating inductive coil components for the transfer of AC power from the surface location to the remote location, and where the instrument has a capability of converting AC power to DC power and has a logic processor responsive to a discrete digital address for operating said instrument and further has current modulation means for modulating the power current as a function of the operation of the instrument, the method including the steps of:

selecting the location to be operated from the surface location and generating a discrete digital address for the logic processor of a selected instrument at such location by impressing a discrete modulating frequency on the power frequency for operating said selected instrument, at said surface location, detecting current modulation from said instrument for obtaining a representation of the operation of the instrument.

7. The method as set forth in claim 6 wherein more than one locations are selectively actuated for obtaining a representation of the operation of the instrument.

* * * * *